(12) United States Patent
Kamiya et al.

(10) Patent No.: US 11,060,890 B2
(45) Date of Patent: Jul. 13, 2021

(54) SENSOR AND ROBOT

(71) Applicant: Seiko Epson Corporation, Tokyo (JP)

(72) Inventors: Toshiyuki Kamiya, Fujimi (JP);
Toshioki Shimojima, Chino (JP);
Hideaki Oka, Minowa (JP); Mitsuhiro Yamamura, Suwa (JP); Hajime Kobayashi, Chino (JP)

(73) Assignee: Seiko Epson Corporation

( * ) Notice: Subject to any disclaimer, the term of this patent is extended or adjusted under 35 U.S.C. 154(b) by 301 days.

(21) Appl. No.: 16/190,492

(22) Filed: Nov. 14, 2018

(65) Prior Publication Data

US 2019/0145798 A1    May 16, 2019

(30) Foreign Application Priority Data

Nov. 15, 2017    (JP) .............................. JP2017-219663

(51) Int. Cl.
| | | |
|---|---|---|
| *G01D 5/24* | (2006.01) | |
| *B25J 19/02* | (2006.01) | |
| *B25J 9/16* | (2006.01) | |
| *B25J 13/08* | (2006.01) | |
| *B25J 19/06* | (2006.01) | |
| *G01L 5/00* | (2006.01) | |

(52) U.S. Cl.
CPC .......... *G01D 5/2405* (2013.01); *B25J 9/1694* (2013.01); *B25J 13/085* (2013.01); *B25J 13/086* (2013.01); *B25J 19/02* (2013.01); *B25J 19/06* (2013.01); *G01L 5/0061* (2013.01); *G05B 2219/37284* (2013.01); *G05B 2219/40544* (2013.01); *G05B 2219/40614* (2013.01)

(58) Field of Classification Search
CPC ....... G01D 5/2405; B25J 13/085; B25J 19/06; B25J 13/086; B25J 19/02; B25J 9/1694; B25J 13/089; B25J 13/087; G05B 2219/37284; G05B 2219/40614; G05B 2219/40544; G01L 5/0061
USPC ........................................................ 700/258
See application file for complete search history.

(56) References Cited

U.S. PATENT DOCUMENTS

| | | | | |
|---|---|---|---|---|
| 4,943,889 | A * | 7/1990 | Ohmatoi | G01B 7/023 361/284 |
| 5,166,679 | A * | 11/1992 | Vranish | B25J 13/086 324/687 |
| 7,242,323 | B2 * | 7/2007 | Sato | G01D 5/24 307/651 |
| 10,003,334 | B2 * | 6/2018 | Fasshauer | H03K 17/955 |
| 2005/0068712 | A1 * | 3/2005 | Schulz | H03K 17/955 361/287 |

(Continued)

FOREIGN PATENT DOCUMENTS

| | | | |
|---|---|---|---|
| JP | 2010-010116 A | 1/2010 | |
| WO | WO2017170305 | * 10/2017 | .............. B25J 19/06 |

*Primary Examiner* — Khoi H Tran
*Assistant Examiner* — B M M Hannan
(74) *Attorney, Agent, or Firm* — Harness, Dickey & Pierce, P.L.C.

(57) ABSTRACT

A robot includes a sensor including an electrode portion of a sensor for detecting approach of or contact with another object is formed on an outer surface or an inner surface of an exterior member, and in which a drive unit of the robot main body is controlled so as to avoid approach between the robot body and the other object based on an output signal of the sensor.

16 Claims, 12 Drawing Sheets

(56) References Cited

U.S. PATENT DOCUMENTS

| | | | |
|---|---|---|---|
| 2006/0037393 A1* | 2/2006 | Itakura | G01N 27/223 |
| | | | 73/335.04 |
| 2015/0290809 A1* | 10/2015 | Nakagawa | B25J 9/1676 |
| | | | 700/258 |
| 2016/0059407 A1* | 3/2016 | Sonoda | B25J 9/0081 |
| | | | 700/260 |
| 2017/0066130 A1* | 3/2017 | Corkum | B25J 9/1651 |
| 2017/0285625 A1* | 10/2017 | Sato | G05B 19/423 |
| 2017/0285847 A1* | 10/2017 | Uehara | G06F 3/0446 |
| 2018/0236667 A1* | 8/2018 | Gombert | B25J 19/06 |
| 2018/0238672 A1* | 8/2018 | Miyagi | H03K 17/9622 |
| 2019/0033481 A1* | 1/2019 | Iida | G01V 3/08 |
| 2020/0171680 A1* | 6/2020 | Roziere | B25J 13/087 |

\* cited by examiner

SENSOR AND ROBOT

BACKGROUND

1. Technical Field

The present invention relates to a sensor and a robot.

2. Related Art

In the related art, an industrial robot that performs work to grip a target is known. Such an industrial robot includes, for example, a base and an arm provided so as to be pivotable with respect to the base, and in general, an end effector such as a hand for gripping the target is attached to the tip end of the arm.

In recent years, in order to prevent an accident caused by a collision between an industrial robot and an object such as a human body, a technology in which a sensor is provided for an arm around which a shock absorbing cushion is wound and an object which approaches and comes in contact is sensed by the sensor so that the robot is caused to perform an avoidance operation or a stop operation is developed (see, for example, JP-A-2010-10116).

However, as in the related art, when a shock absorbing cushion is wound around the arm, there are the following problems. In a case where the sensor is disposed on the cushion, when the cushion is deformed by an operation of the arm, since a sensor output varies and erroneous detection of proximity detection and contact detection occurs, efficient work cannot be performed. In a case where the sensor is disposed under the cushion, since a distance between the object and the sensor is increased by a thickness of the cushion, sensitivity of the proximity detection is reduced. Also, since impact force at the time of the collision is absorbed by the cushion, responsiveness of contact force detection deteriorates. For that reason, it was impossible to avoid collision reliably.

Furthermore, in the robot of the related art, although a proximity sensor is provided for the arm, in general, since the end effector is exchanged according to a work content, it is not practical to directly provide the proximity sensor to the end effector. Also, if the proximity sensor is provided on the end effector, there is a problem that the proximity sensor operates before contacting the target in contact work between the target and the end effector, and the work cannot be continued. For that reason, with the robot of the related art, it is difficult to detect a collision against the end effector or a target gripped by the end effector.

SUMMARY

An advantage of some aspects of the invention is to provide a robot which includes a sensor for accurately performing proximity detection and contact detection between a movable device such as a robot and another object and is able to improve safety against the collision without causing troubles in contact work between the target and the end effector.

The invention can be implemented as the following application examples or forms.

A sensor according to an application example detects approach of or contact with another object and includes a detection electrode portion formed on an outer surface or an inner surface of an exterior member of a movable device.

According to the sensor, it is possible to accurately perform proximity detection and contact detection between a movable device such as a robot and another object, and even if there is no cushion for absorbing shock, it is possible to improve safety of a cooperative robot and the like.

A sensor according to an application example includes a detection electrode portion for detecting approach of or contact with another object, a detection circuit unit of which output changes in accordance with approach or contact between the detection electrode portion and the other object, and a connection portion for electrically connecting the detection electrode portion and the detection circuit unit, and in which the detection electrode portion is provided in close contact with an exterior member of a movable device, and a relative position of the connection portion with respect to the detection electrode portion and a relative position of the detection circuit unit with respect to the connection portion do not change.

According to the sensor, it is possible to reduce or prevent a change in sensor output due to deformation or swinging of sensor constituent elements such as a detection electrode portion, a connection portion, and a detection circuit unit during operation of a movable device such as a robot, so that it is possible to reduce or prevent malfunction of the sensor caused by the operation of the movable device.

In the sensor according to the application example, it is preferable that at least a part of the outer surface and the inner surface of the exterior member of the movable device has a curved surface that is not a developable surface, and a detection electrode having a curved surface shape which is not a developable surface is formed in accordance with the exterior member.

With this configuration, the detection electrode can be provided in close contact with any part of the exterior portion of the movable device such as a robot, an area where contacting or approaching of an object to a robot main body can be detected is expanded, and safety performance of the robot can be further improved.

In the sensor according to the application example, it is preferable that the sensor is an electrostatic capacitance type sensor that detects contact or approach of the object according to a change in electrostatic capacitance of a detection electrode.

With this configuration, it is possible to detect contact or approach of the object without being greatly affected by the influence of a color or the like of the object or the influence of an ambient temperature as compared with other sensors such as a photoelectric type sensor.

In the sensor according to the application example, it is preferable that the sensor is a mutual-capacitive electrostatic capacitance type sensor including the detection electrode and a drive electrode.

With this configuration, compared to a self-capacitive sensor, it is possible to detect approach from a distance and provide a safer cooperative robot.

A robot according to an application example includes the sensor according to the application example, a robot main body in which the sensor is disposed on an exterior portion, a control device that controls a drive unit of the robot main body based on an output signal of the sensor.

According to the robot, it is possible to accurately perform proximity detection and contact detection with another object, and even if there is no cushion for absorbing shock, it is possible to realize a cooperative robot that can work safely with people can be used.

In the robot according to the application example, it is preferable that the control device controls the drive unit of the robot main body so as to avoid approach between the robot main body and another object based on the output signal of the sensor.

With this configuration, since the robot can be operated so as to avoid contact with approach of a person, it is possible to configure a safer cooperative robot.

In the robot according to the application example, it is preferable that the robot main body includes a force detection system, and the control device controls the drive unit of the robot main body based on the output signal of the sensor and an output signal of the force detection system.

With this configuration, even in a case where the robot main body is controlled based on detected force of the force detection system like direct teaching, it is possible to detect and avoid that the robot main body approaches another surrounding object and thus, it is possible to use the robot more conveniently.

In the robot according to the application example, it is preferable that approach between the robot main body and another object is avoided based on the output signal of the sensor and contact between any one of the robot main body, an end effector, the target, and another object is avoided based on the output signal of the force detection system.

With this configuration, a collision against the target or the like gripped by the end effector or the end effector can be detected by the force detection system. In addition, there is no hindrance to contact work between the target and the end effector. For that reason, safety at the time of a collision can be improved. Therefore, the robot can be suitably used as a cooperative robot capable of cooperating with people.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a sensor and a robot according to the invention will be described in detail based on preferred embodiments illustrated in the accompanying drawings.

Basic Configuration of Robot

Figure 1:
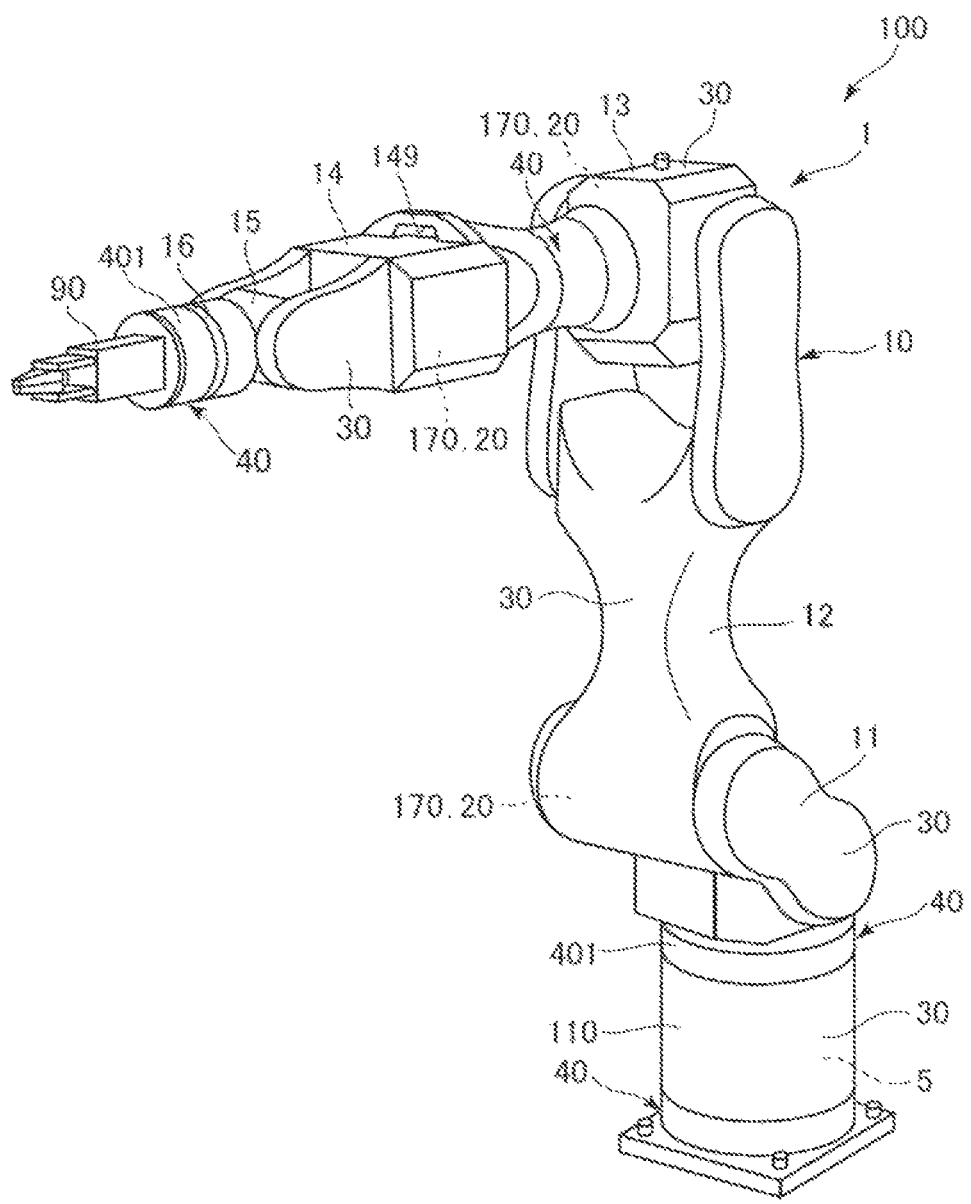
FIG. 1 is a perspective view illustrating a robot according to a preferred embodiment of the invention.
Figure 2:
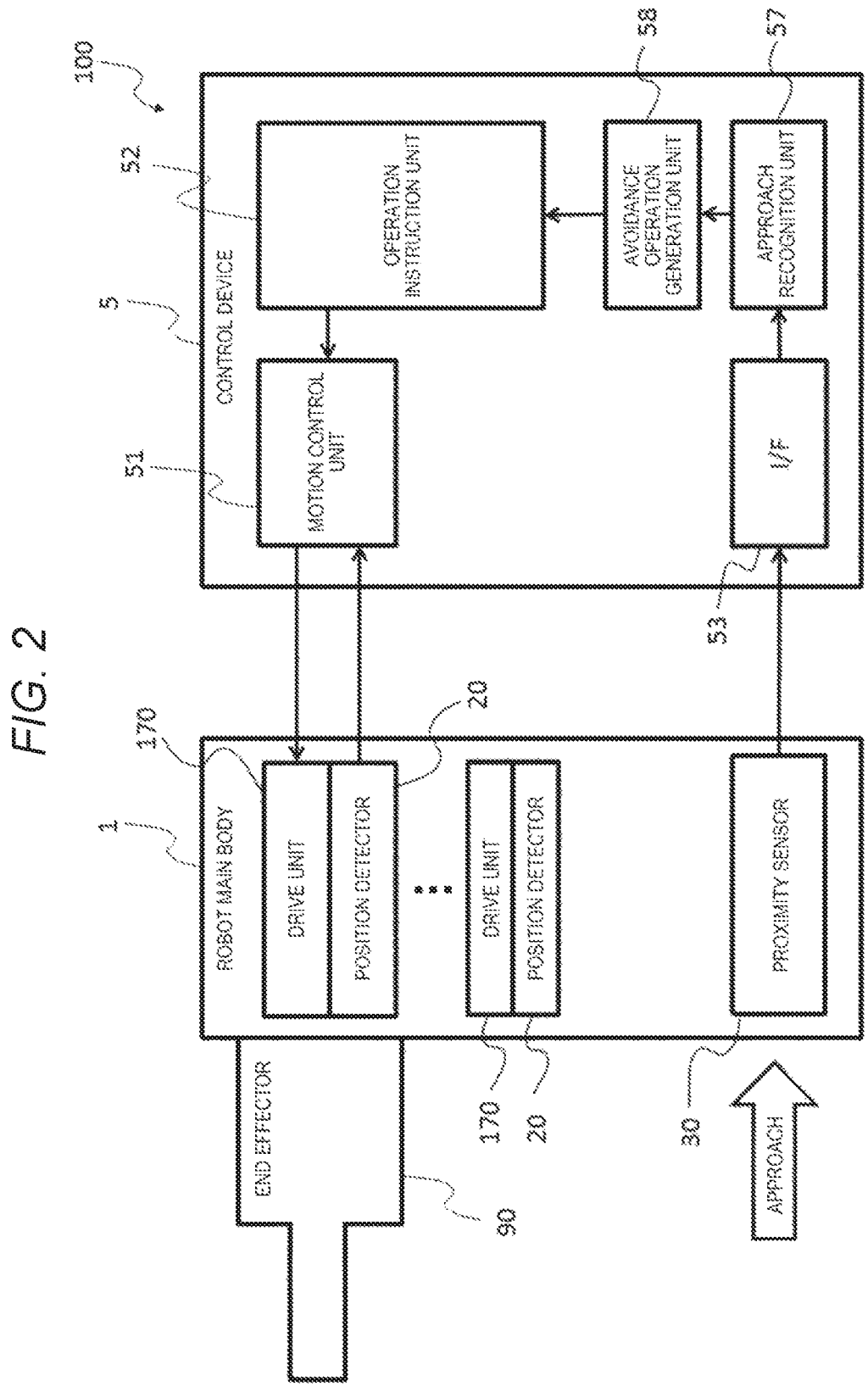
FIG. 2 is a block diagram of a configuration example of a robot illustrated in FIG. 1.
Figure 3:
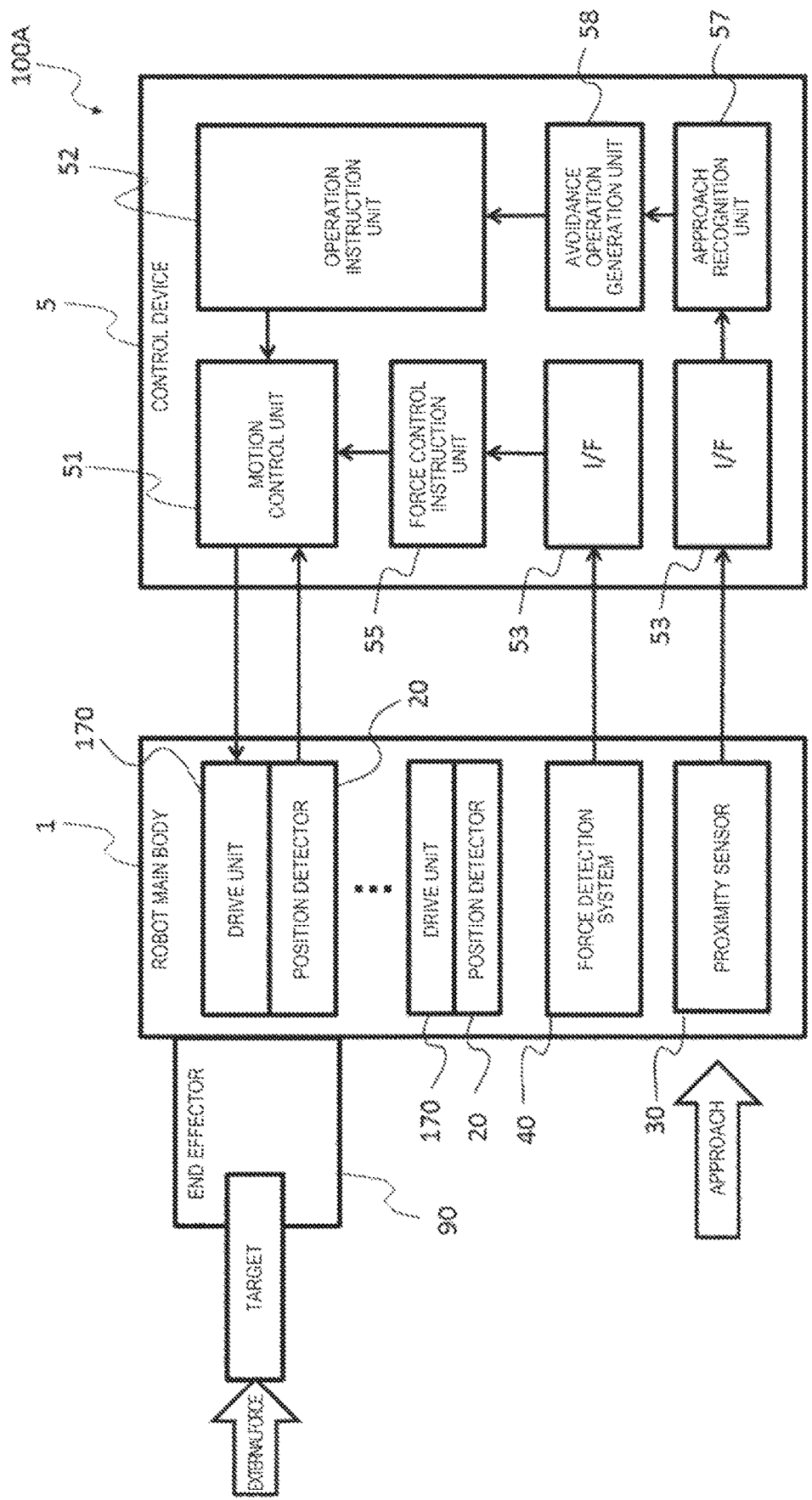
FIG. 3 is a block diagram of a modification example of the robot illustrated in FIG. 1.
Figure 4:
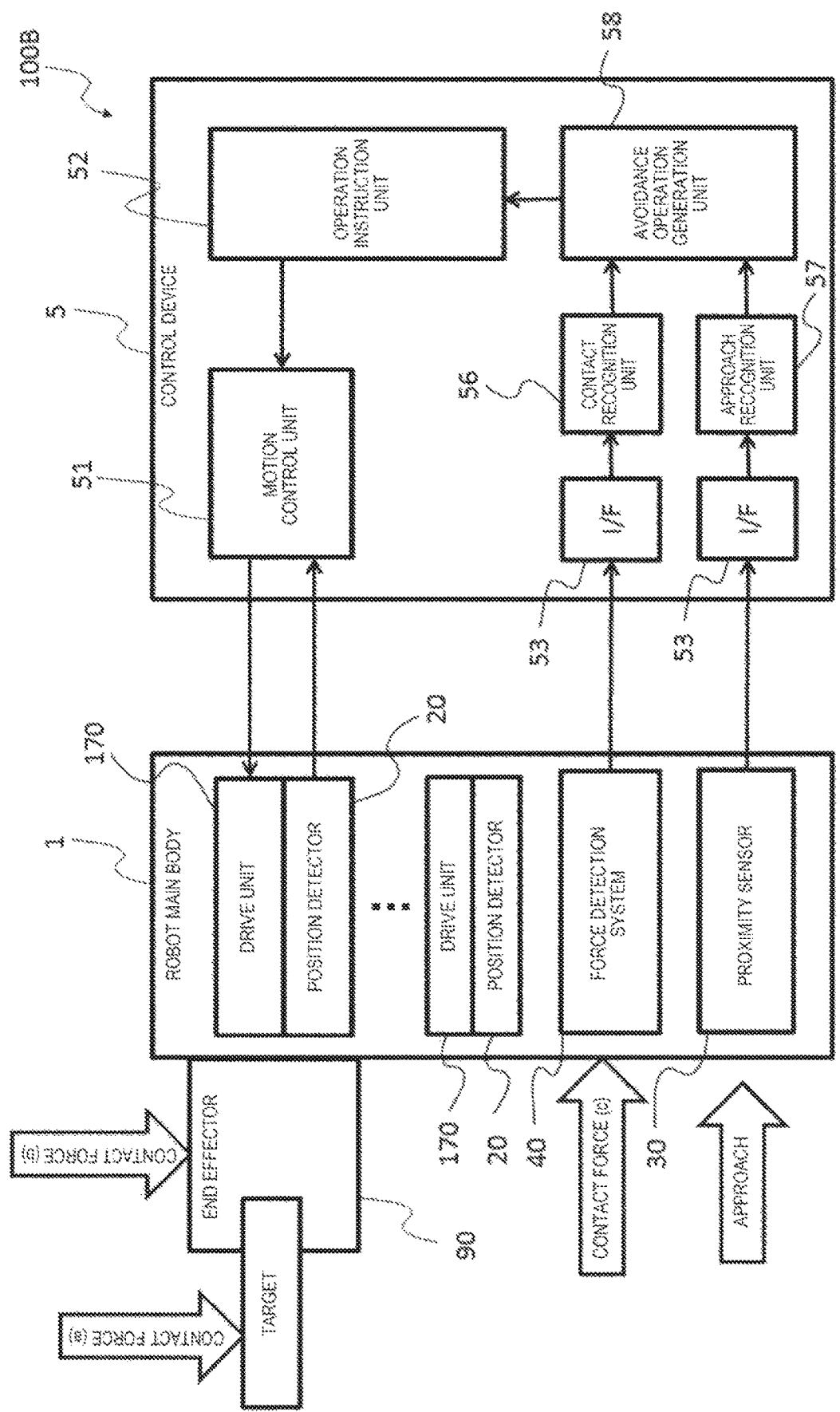
FIG. 4 is another block diagram of the modification example of the robot illustrated in FIG. 1.
Figure 5:
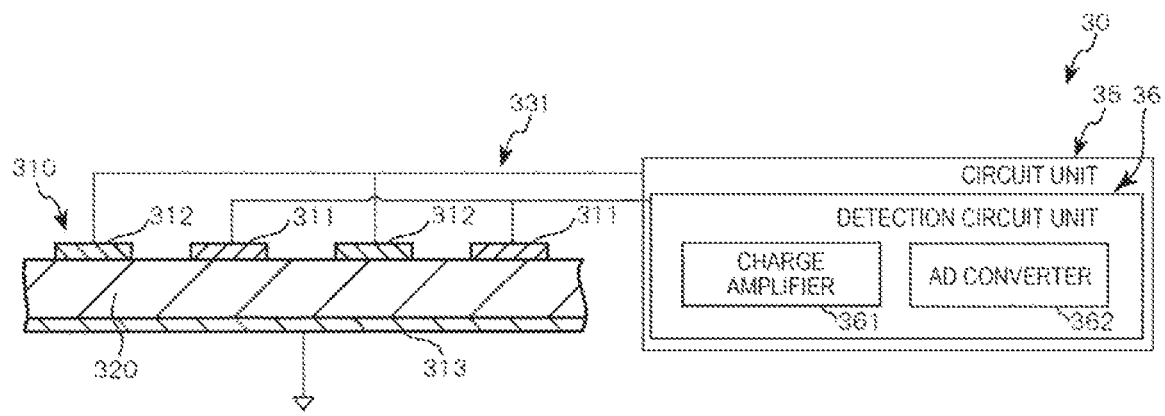
FIG. 5 is a schematic view for explaining a configuration of a proximity sensor.
Figure 6:
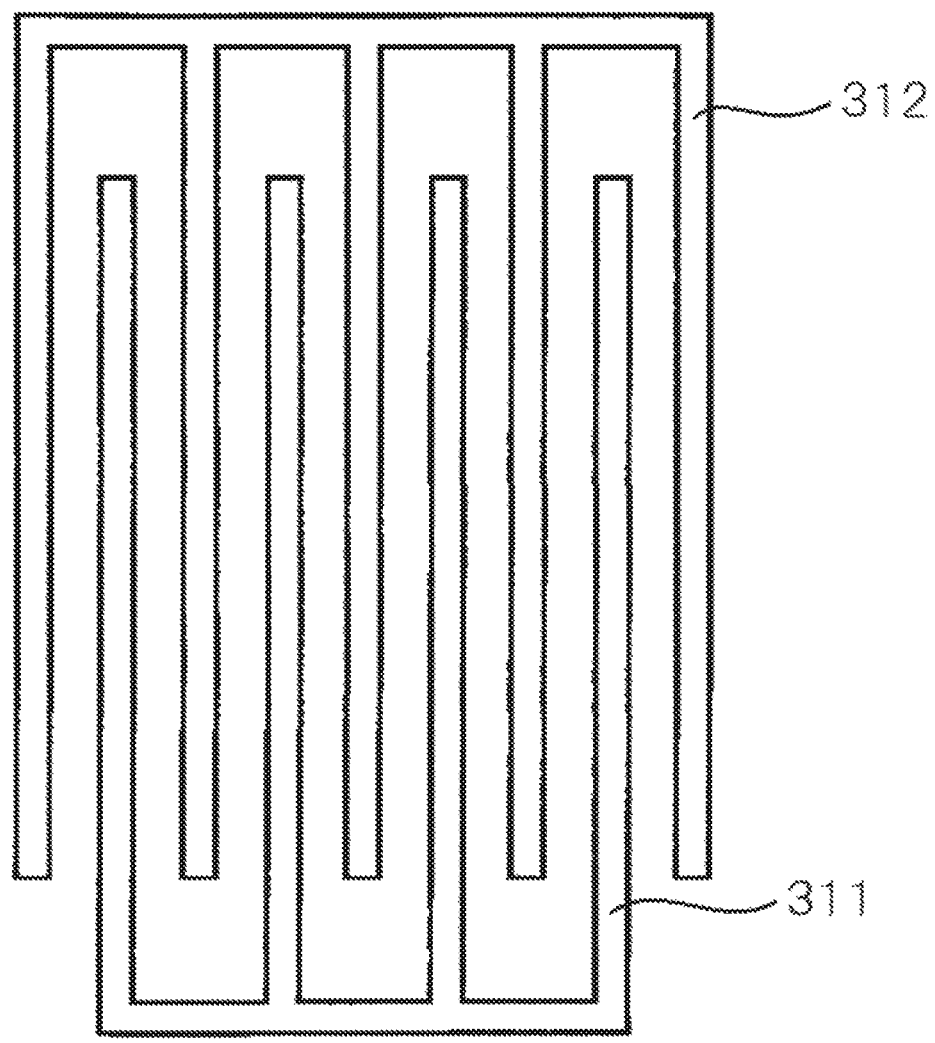
FIG. 6 is a view illustrating an example of disposition of a first electrode (detection electrode) and a second electrode (drive electrode).
Figure 7:
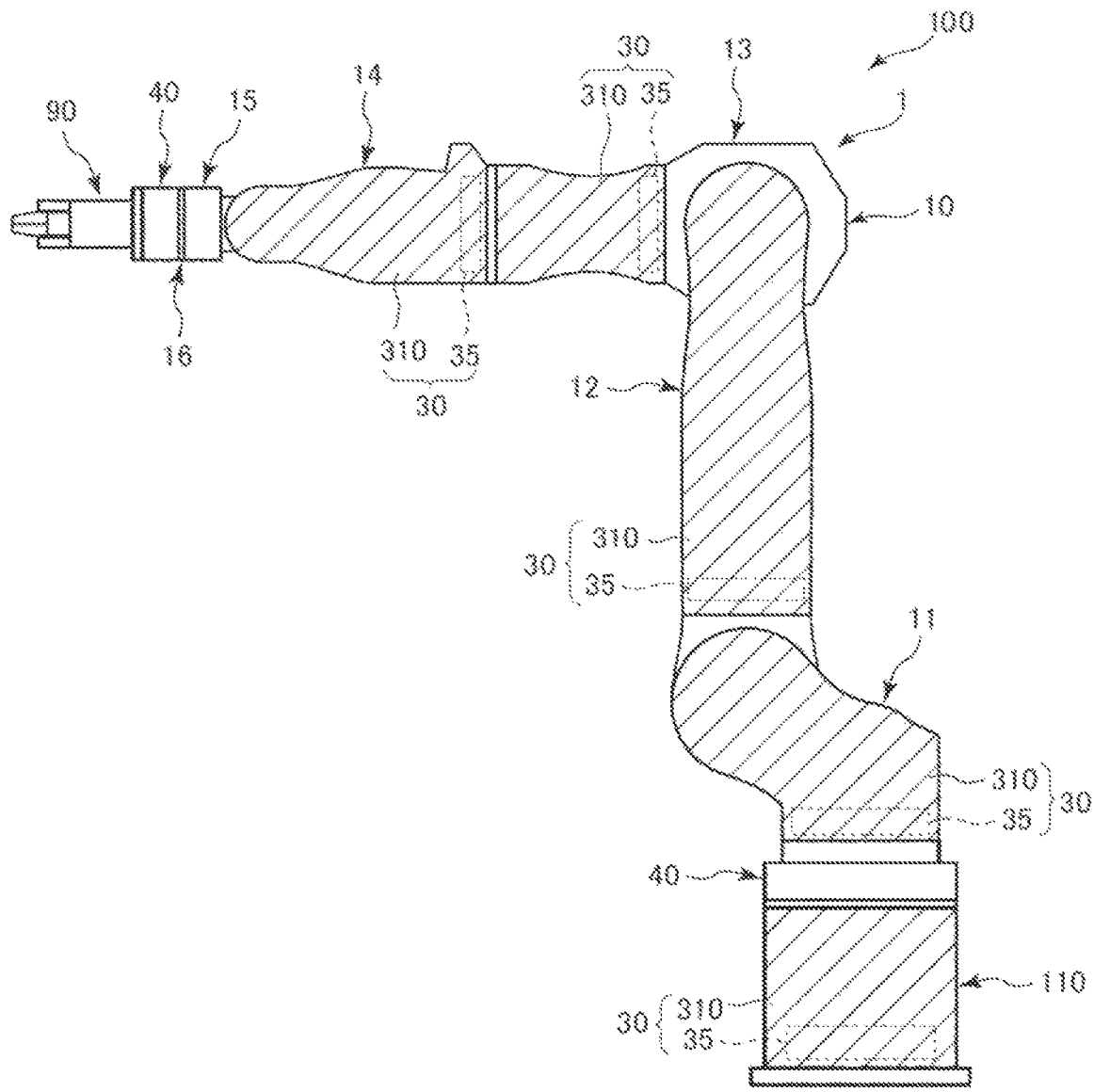
FIG. 7 is a diagram illustrating disposition of an electrode portion and a detection circuit unit in a robot arm.
Figure 8:
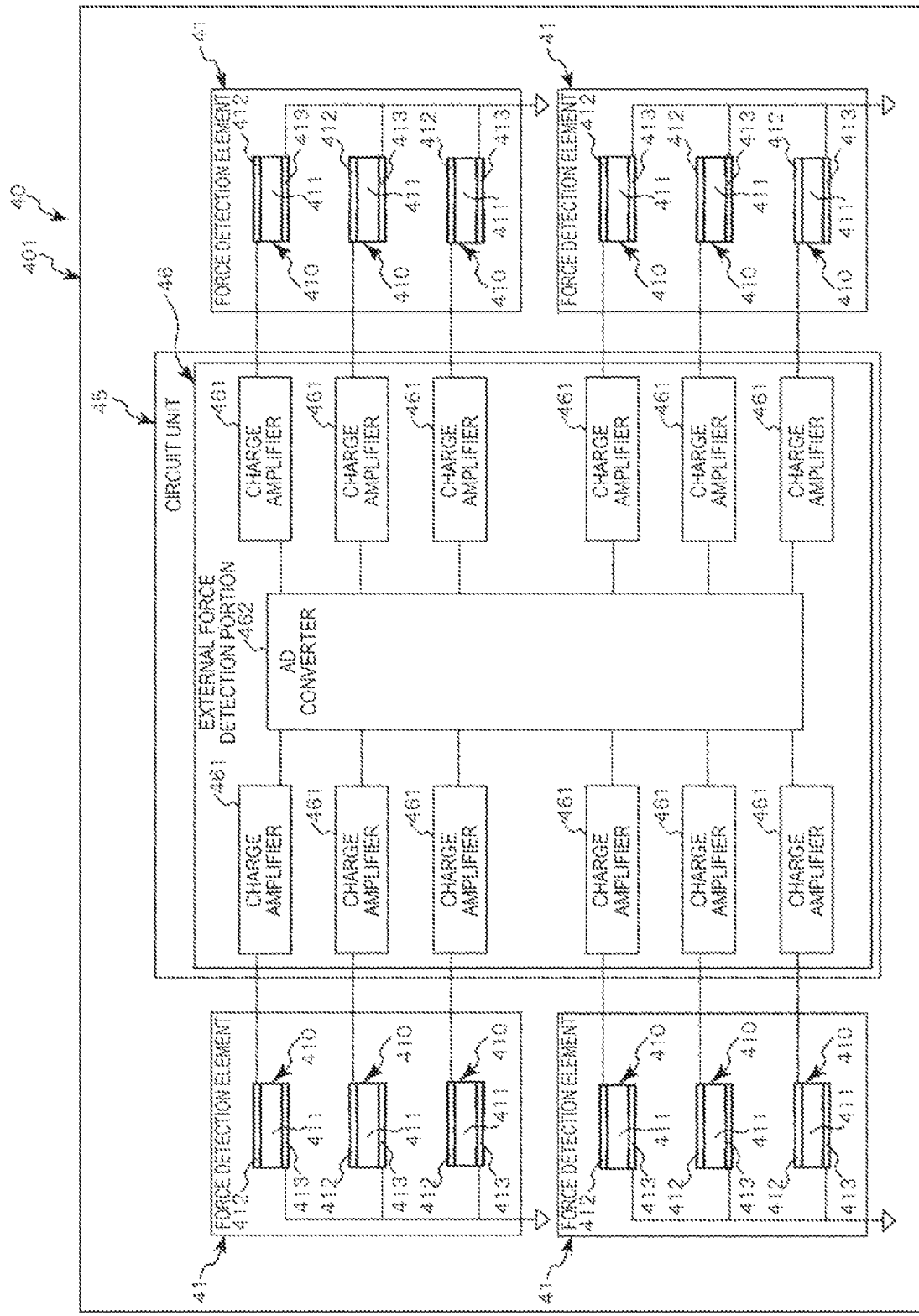
FIG. 8 is a view for explaining a schematic configuration of a force detection system.
Figure 9:
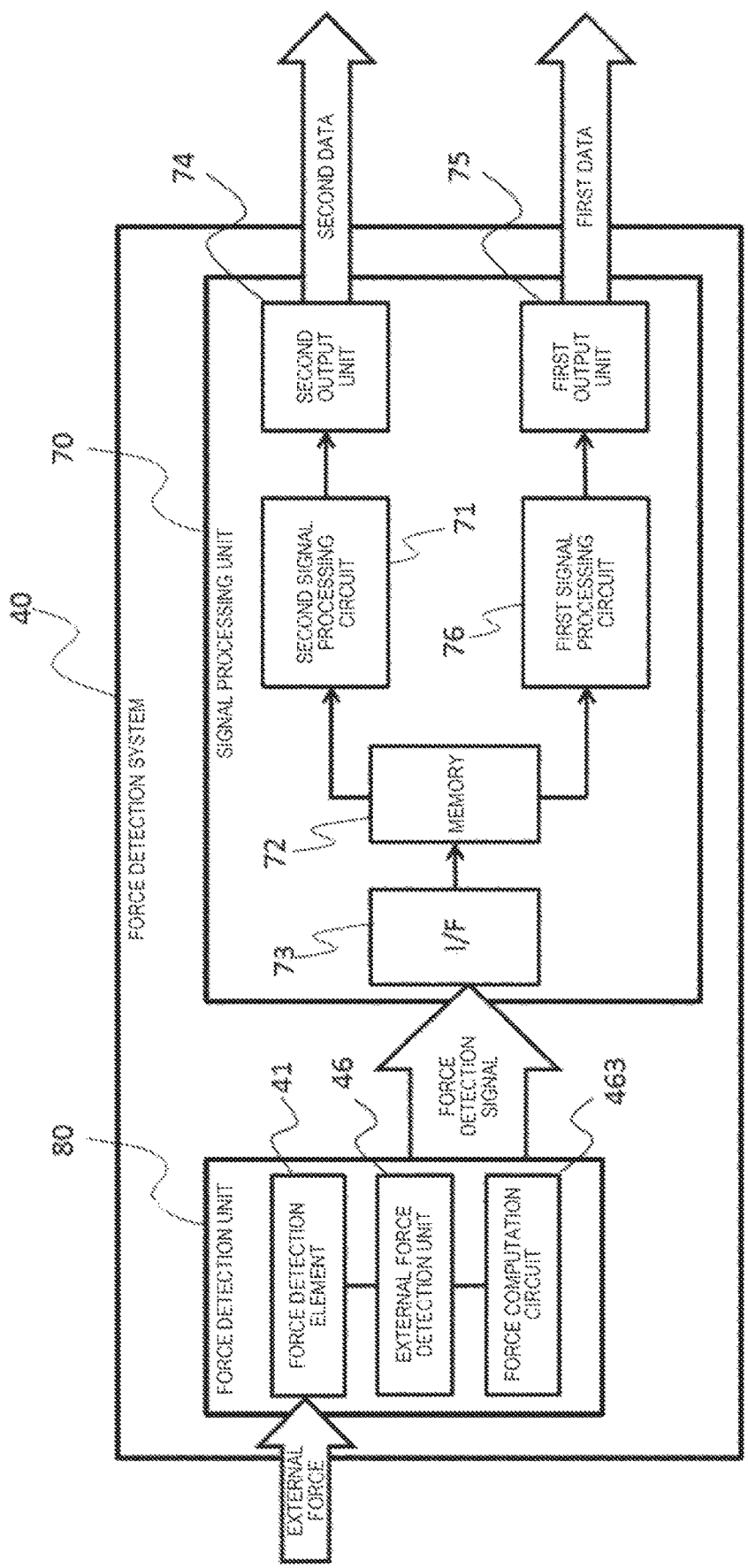
FIG. 9 is a block diagram of a modification example of the force detection system.

FIG. 1 is a perspective view illustrating a robot according to a preferred embodiment of the invention. FIG. 2 is a block diagram of a configuration example of a robot illustrated in FIG. 1. FIG. 3 is a block diagram of a modification example of the robot illustrated in FIG. 1. FIG. 4 is another block diagram of the modification example of the robot illustrated in FIG. 1. FIG. 5 is a schematic view for explaining a configuration of a proximity sensor. FIG. 6 is a view illustrating an example of disposition of a first electrode (detection electrode) and a second electrode (drive electrode). FIG. 7 is a diagram illustrating disposition of an electrode portion and a detection circuit unit in a robot arm. FIG. 8 is a view for explaining a schematic configuration of a force detection system. FIG. 9 is a block diagram of a modification example of the force detection system. In the following description, for convenience of description, the upper side in FIG. 1 is referred to as "upper" and the lower side is referred to as "lower". The base 110 side in FIG. 1 is referred to as a "base end side", and the opposite side (end effector 90 side) is referred to as a "tip end side". Further, the up-and-down direction in FIG. 1 is defined as the "vertical direction", and the right-and-left direction is defined as the "horizontal direction".

A robot 100 illustrated in FIG. 1 is a so-called six axis vertical articulated robot. For example, the robot 100 can perform works such as feeding, removing material, transporting, and assembling precision instruments and constituent parts (targets) thereof.

As illustrated in FIG. 1, the robot 100 includes a robot main body 1 including a base 110 and a robot movable unit 10, and a control device 5 (controller) for controlling an operation of the robot movable unit 10. The robot 100 includes a drive unit 170, a position detector 20, a proximity sensor 30, and a force detection system 40 provided on the robot main body 1 (see FIGS. 1 to 4). The number of installed position detector 20, proximity sensor 30, and force detection system 40 and the number of installation places thereof are not limited to the embodiments which will be described later.

Robot Main Body

Base

The base 110 is fixed, for example, to a floor, a wall, a ceiling, a movable carriage, and the like. Although not illustrated in detail, the base 110 is configured to include an exterior member (housing, cover, and the like), and a control device 5 is accommodated in an internal space formed by the exterior member.

Robot Movable Unit

The robot movable unit 10 is pivotably supported on the base 110, and includes an arm 11 (first arm), an arm 12 (second arm), an arm 13 (third arm), an arm 14 (fourth arm), an arm 15 (fifth arm), and an arm 16 (sixth arm, tip end arm). These arms 11 to 16 are connected in this order from the base end side to the tip end side, and are configured so as to be pivotable relative to the adjacent base end side arm or the base 110. Connection portions each of which pivotably connects two members with each other among the base 110 and the arms 11 to 16 constitute a "joint portion". Although not illustrated in detail, each of the arms 11 to 16 is configured to include an exterior member (a housing, a cover, or the like), and a drive unit 170 and the position detector 20 are accommodated in an internal space formed by the exterior member.

An end effector 90 configured by a hand capable of gripping a target, for example, is attached to the tip end portion of the arm 16 via a force detection system 40. A connector (not illustrated) included in a cable (not illustrated) connected to the end effector 90 is connected to a connector insertion portion 149 provided on the arm 14. With this configuration, the end effector 90 is electrically connected to the control device 5 via a wiring (not illustrated) provided on the robot movable unit 10.

Drive Unit

As illustrated in FIG. 2, the robot 100 includes one or more drive units 170 for each of the arms 11 to 16, and a single arm may be equipped with a plurality of drive units 170 and position detectors 20. Each of the plurality of drive units 170 has a function of pivoting a corresponding arm with respect to an arm (or base 110) positioned on the base end side thereof, that is, a function of driving each joint portion of the robot movable unit 10 and includes a motor unit (not illustrated) including a motor and a brake, and a power transmission mechanism (not illustrated) including a reduction gear, a belt, a pulley, and the like. The drive unit 170 may include a motor driver (not illustrated) electrically connected to the control device 5.

Position Detector

As illustrated in FIG. 2, the robot 100 includes the position detector 20 corresponding to the drive unit 170, and one position detector 20 is provided for one drive unit 170. The position detector 20 measures a rotation angle of a rotation shaft of the motor or the reduction gear. With this configuration, it is possible to obtain information (information on a driving state of each joint portion) such as an angle (orientation) of the arm on the tip end side with respect to the arm on the base end side. As each of the position detectors 20, for example, a magnetic rotary encoder or an optical rotary encoder or the like can be used. Each position detector 20 is electrically connected to a control device 5 to be described later. The position detector 20 may have two or more position detectors for one drive unit. For example, it is possible to construct a safe robot by accurately positioning the robot by detecting the rotation angle of the motor and the rotation angle of the arm respectively, or by mutually monitoring the rotation angle by measuring the rotation angle of the same motor with two position detectors 20.

Proximity Sensor

As illustrated in FIGS. 1 to 4, the robot 100 includes proximity sensors 30. More specifically, one proximity sensor 30 is provided for the base 110 and each of the arms 11 to 14. In the embodiment, the proximity sensor 30 is not provided on the arms 15 and 16, but the proximity sensor 30 may also be provided on the arms 15 and 16.

The proximity sensor 30 is, for example, an electrostatic capacitance type sensor that detects a change in electrostatic capacitance caused by contact or approach of an object such as a person existing around the robot 100. In particular, in the embodiment, the proximity sensor 30 is a mutual-capacitive electrostatic capacitance type sensor.

As illustrated in FIG. 5, the proximity sensor 30 includes an electrode portion 310 for outputting a signal (electric charge) in accordance with a change in electrostatic capacitance caused by contact or approach of an object, a circuit unit 35 including a detection circuit unit 36 for processing a signal (electric charge) from the electrode portion 310, and a wiring 331 for electrically connecting the electrode portion 310 and the circuit unit 35. Although not illustrated, the wiring 331 includes a wiring of a drive system for electrically connecting the circuit unit 35 and a second electrode 312 and a wiring of a signal system for electrically connecting the circuit unit 35 (detection circuit unit 36) and a first electrode 311.

The electrode portion 310 includes a first electrode 311 (detection electrode), a second electrode 312 (drive electrode) to which an alternating voltage is applied, and a ground electrode 313 which is a reference potential.

As illustrated in FIG. 5, the first electrode 311 and the second electrode 312 are spaced apart from each other. As illustrated in FIG. 6, the first electrode 311 and the second electrode 312 each have a comb teeth shape in a plan view, and the comb teeth of the first electrode 311 and the comb teeth of the second electrode 312 are disposed so as to be engaged while being separated from each other. As illustrated in FIG. 5, the ground electrode 313 is disposed with respect to the first electrode 311 and the second electrode 312 with an insulation layer 320 interposed therebetween.

In such an electrode portion 310, an alternating voltage is applied to the second electrode 312 to generate an electric field between the first electrode 311 and the second electrode 312. When the object approaches the electrode portion 310 in this state, the electric field between the first electrode 311 and the second electrode 312 changes. The contact or approach of the object can be detected by detecting the change in the electrostatic capacitance due to change in the electric field with the first electrode 311. The ground electrode 313 functions as an electromagnetic shield.

Further, disposition of the first electrode 311, the second electrode 312 and the ground electrode 313 is not limited to the illustrated example, and may be disposed in an optional manner. For example, the electrodes may be provided on the same side of the insulation layer 320 as the first electrode 311 or the like. In this case, the ground electrode 313 may be provided so as to surround the first electrode 311 in a plan view.

As illustrated in FIG. 5, the circuit unit 35 includes the detection circuit unit 36 for processing electric charges received from the electrode portion 310 (specifically, the first electrode 311) and a drive circuit for supplying electric power to the second electrode 312 (not illustrated). The detection circuit unit 36 includes a charge amplifier 361 (amplifier circuit) and an AD converter 362 (conversion output circuit). The charge amplifier 361 converts electric charges output from the first electrode 311 into a voltage. The AD converter 362 converts a voltage signal of a voltage output from the charge amplifier 361 from an analog signal into a digital signal at a predetermined sampling frequency. Voltage information (digital signal) converted by the AD converter 362 is transferred to the control device 5.

As illustrated in FIG. 5, such a proximity sensor 30 is provided on each of the base 110 and the arms 11 to 14. The electrode portion 310 included in the proximity sensor 30 is provided, for example, at a place indicated by hatching in FIG. 5, and is disposed on each outer surface side (outer surface of the exterior member) of the base 110 and the arms 11 to 14. The circuit unit 35 is provided, for example, at a place indicated by a broken line in FIG. 5, and similarly to the electrode portion 310, the circuit unit 35 is disposed on each outer surface side (outer surface of the exterior member) of the base 110 and the arms 11 to 14. As described above, in the robot 100, proximity detection can be performed over a wide range of the robot movable unit 10 by providing one electrode portion 310 and one circuit unit 35 on each of the base 110 and the arms 11 to 14.

Force Detection System

As illustrated in FIG. 1, the robot 100 includes four force detection systems 40. The force detection system 40 is provided on a base end surface of the base 110, a portion (connection portion) between the base 110 and the robot movable unit 10, the intermediate portion of the arm 13, and a portion (connection portion) between the robot movable unit 10 and the end effector 90. These force detection systems 40 may be mounted at a plurality of places even at any one place of the robot main body 1 or a plurality of force detection systems 40 may be mounted at a single place.

The force detection system 40 is, for example, a six-axis force sensor capable of detecting six-axis component of external force applied to the force detection system 40. Here, the six-axis component is translational force (shearing force) component in the direction of each of the three mutually orthogonal axes and rotational force (moment) component around the respective axes of the three axes. The number of detection axes of the force detection system 40 is not limited to six, and may be, for example, one or more and five or less.

As illustrated in FIG. 8, the force detection system 40 includes a plurality of force detection elements 41 for outputting signals (electric charges) according to external force, a circuit unit 45 for processing signals (electric charges) from the force detection elements 41, and a case 401 that accommodates the force detection elements 41 and the circuit unit 45 and transmits the external force to the force detecting element 41.

The force detection element 41 includes a plurality of piezoelectric elements 410. Each piezoelectric element 410 includes a piezoelectric body 411 made of a piezoelectric material such as quartz, an output electrode 412 outputting electric charge generated by the piezoelectric effect of the piezoelectric body 411, and a ground electrode 413 serving as a reference potential.

The circuit unit 45 includes an external force detection portion 46 for processing the electric charge received from the force detection element 41 and a power supply circuit (not illustrated) for supplying electric power to each portion of the force detection system 40. The external force detection portion 46 includes a charge amplifier 461 (amplifier circuit) provided corresponding to each piezoelectric element 410 and an AD converter 462 (conversion output circuit). The charge amplifier 461 converts the electric charge output from the piezoelectric element 410 into a voltage. The AD converter 462 converts a voltage signal of a voltage output from the charge amplifier 461 from an analog signal into a digital signal at a predetermined sampling frequency. The voltage information (digital signal) converted by the AD converter 462 is computed as a six-axis component by the force computation circuit 463 and is transferred to the control device 5 as force sense data.

The number of the force detection elements 41 is not limited to four as illustrated in the drawing, and an optional number of the force detection elements 41 may be used. However, in order to detect the six-axis component, it is preferable that the force detection system 40 includes at least three force detection elements 41.

As illustrated in FIG. 9, a signal processing unit 70 for performing signal processing such as down-sampling and outputting force sense data computed by the force computation circuit 463 may be included. For example, the signal processing unit 70 is configured with a memory 72 for temporarily storing input force sense data, a first signal processing circuit 76, a first output unit 75, a second signal processing circuit 71, and a second output unit 74. With such a configuration, it is possible to output first data and second data different from each other based on the force sense data from the first output unit and the second output unit of different systems according to the purpose.

Control Device

The control device 5 (controller) illustrated in FIGS. 1 to 4 has a function of controlling the operation of the robot movable unit 10 based on the detection results of the position detector 20, the proximity sensor 30, and the force detection system 40. The control device 5 includes a processor such as a central processing unit (CPU), a memory such as a read only memory (ROM), a random access memory (RAM), and an interface circuit (I/F) 53. The control device 5 generates an operation trajectory of the robot main body 1 based on a program and teaching data stored in the memory, and sends an operation instruction to a motion control unit 51. Although not illustrated in part, the I/F 53 is configured to be able to communicate with the drive unit 170, the position detector 20, the proximity sensor 30, the force detection system 40, and the end effector 90. Although not illustrated, the control device 5 includes a power supply circuit for generating electric power required for each constitutional element of the control device 5 and the drive unit 170 (motor driver).

The control device 5 is disposed inside the base 110 of the robot main body 1 in the drawing, but is not limited thereto, and for example, the control device 5 may be disposed outside the robot main body 1. Further, a display device including a monitor such as a display, an input device including, for example, a mouse or a keyboard, or the like, may be connected to the control device 5.

The basic configuration of the robot 100 has been described as above. In such a robot 100, an operation sequence generated in advance by teaching work is stored in the memory of the control device 5, and the control device 5 sends signals relating to a rotation speed and rotation angle to each drive unit 170 according to the operation sequence to drive each drive unit 170. With this configuration, the robot movable unit 10 is driven. The control device 5 receives a signal from the position detector 20 and performs feedback control based on the signal. Furthermore, in the embodiment, the control device 5 receives a signal corresponding to the external force from the force detection system 40. Based on the signal from the force detection system 40, the force control instruction unit 55 generates a force control instruction to be sent to the motion control unit 51. The motion control unit 51 sends a signal to each drive unit 170 based on the received force control instruction and operates the robot movable unit 10 so as to perform work while detecting a work state of the end effector 90 on the target.

By controlling the operation of the robot movable unit 10 by the control device 5 as described above, the robot 100 can accurately perform work corresponding to the operation sequence generated by teaching in advance.

The control device 5 transmits and receives signals to and from the respective proximity sensors 30 while controlling the operation of the robot movable unit 10. Specifically, for example, the control device 5 receives the signal from the proximity sensor 30 while transmitting the signal for adjusting sensitivity of each proximity sensor 30 to the proximity sensor 30, and based on the signal, determines the presence or absence of contact or approach of the object to the robot main body 1 by the approach recognition unit 57. For example, in a case where an output value from the proximity sensor 30 is equal to or greater than a threshold value (preset threshold value for proximity detection), the approach recognition unit 57 determines that contact or approach of the object to the robot main body 1 is present. In a case where it is determined that contact or approach of the object to the robot main body 1 is present, the approach recognition unit 57 generates an avoidance operation by an avoidance operation generation unit 58 and transfers the avoidance operation to the operation instruction unit 52. The operation instruction unit 52 sends an operation instruction to the motion control unit 51 based on the received avoidance operation. Based on the received operation instruction, the motion control unit 51 sends a signal to each drive unit 170 to reduce the operation speed of the robot movable unit 10, stop the operation of the robot movable unit 10, or switch (reverse) the moving direction of the robot movable unit 10. As such, the control device 5 causes the robot movable unit 10 to perform an avoidance operation or a stop operation on the object based on signals from the respective proximity sensors 30.

Furthermore, the control device 5 determines the presence or absence of contact of the object to the robot main body 1 based on the signal from the force detection system 40. For example, in a case where the output value from the force detection system 40 is equal to or greater than the threshold value (preset threshold for force detection), the contact recognition unit 56 determines that contact of the object to the robot main body 1 is present. In that case, the control device 5 causes the robot movable unit 10 to perform the avoidance operation or the stop operation on the object.

As such, the control device 5 can cause the robot movable unit 10 to perform the avoidance operation or the stop operation on the object based on the respective signals from the proximity sensor 30 and the force detection system 40.

The basic configuration of the robot 100 has been described as above. As described above, the robot 100 includes the robot main body 1 having the base 110 and the robot movable unit 10 which is provided pivotably with respect to the base 110 and includes the plurality of arms 11 to 16 and to which the end effector 90 can be attached. The robot 100 includes (in the embodiment, the plurality of) proximity sensors 30 that are provided on the robot movable unit 10 and detect contact or approach of the object to the robot main body 1. The robot 100 includes the force detection system 40 which is provided on at least one of a connection portion between the base 110 and the robot movable unit 10, a connection portion between the arms, and a connection portion between the robot movable unit 10 and the end effector 90, and detects a force applied to the robot main body 1 or the end effector 90. As described above, the force detection system 40 is provided on the connection portion between the base 110 and the robot movable unit 10 (between the base 110 and the robot movable unit 10), a connection portion between the robot movable unit 10 and the end effector 90 (between the robot movable unit 10 and the end effector 90), and the like.

According to such a robot 100, contact or approach of the object to the robot main body 1 can be detected by the proximity sensor 30, and contact with the target gripped by the end effector 90 or the end effector 90 can be detected by the force detection system 40. In particular, since the force detection system 40 is provided at the place described above, it is possible to detect contact of the object in the area where the proximity sensor 30 alone cannot sufficiently detect approach or contact of the object to the robot main body 1. For that reason, it is possible to detect contact or approach of the object to the robot main body 1 over a wide range.

Thus, safety at the time of a collision can be improved. Further, if the proximity sensor 30 is provided for the end effector 90, there is a problem that the proximity sensor 30 provided on the end effector 90 operates before the proximity sensor 30 comes into contact with the object and it is impossible to perform work of contacting the object by the end effector 90. However, according to the robot 100 of the present embodiment, such a problem does not occur. Thus, according to the robot 100, it is possible to improve the safety at the time of a collision without hindering contact work between the object and the end effector 90. For that reason, it is possible to suitably use the robot 100 as a cooperative robot capable of cooperating work with people.

Since the robot 100 includes the proximity sensor 30 and the force detection system 40, for example, in a case where the proximity sensor 30 detects approach of the object, the operation speed of the robot movable unit 10 is reduced, and in a case where contact of the object is detected by the force detection system 40, the operation of the robot movable unit 10 is stopped. With this configuration, it is possible to further reduce danger at the time of a collision while further reducing the decrease in the work efficiency of the robot 100.

Particularly, in the embodiment, as described above, the force detection system 40 is provided on the connection portion between the base 110 and the robot movable unit 10 and the base end surface of the base 110.

With this configuration, in addition to the collision with the end effector 90, the force detection system 40 can detect a collision of the robot movable unit 10 with respect to a spontaneous position. For that reason, it is possible to further improve the safety.

Furthermore, as described above, the force detection system 40 is provided at a connection portion between the robot movable unit 10 and the end effector 90 (between the robot movable unit 10 and the end effector 90).

With this configuration, contact with the end effector 90 can be detected with high accuracy and with high sensitivity. Since work of contacting the target by the end effector 90 can be detected with high accuracy by the force detection system 40, accuracy of work by the robot 100 can also be improved.

The force detection system 40 may be provided at any place among a connection portion between the arm 11 and the arm 12 (between the arm 11 and the arm 12), a connection portion between the arm 12 and the arm 13 (between the arm 12 and the arm 13), a connection portion between the arm 13 and the arm 14 (between the arm 13 and the arm 14), a connection portion between the arm 14 and the arm 15 (between the arm 14 and the arm 15), and a connection portion between the arm 15 and the arm 16 (between the arm 15 and the arm 16).

As described above, in the embodiment, the proximity sensor 30 is also provided on the base 110 in addition to the robot movable unit 10. For that reason, it is possible to further improve the safety.

In the embodiment, the proximity sensor 30 is not provided on the arm 15 and the arm 16, but as described above, since the force detection system 40 is provided between the arm 16 and the end effector 90, safety can be sufficiently ensured even if the proximity sensor 30 is not provided on the arm 15 and the arm 16.

Detailed Description of Proximity Sensor

Next, the proximity sensor 30 will be described in detail. Specifically, disposition of the electrode portion 310 and the circuit unit 35 with respect to the robot main body 1 will be described.

Figure 10:
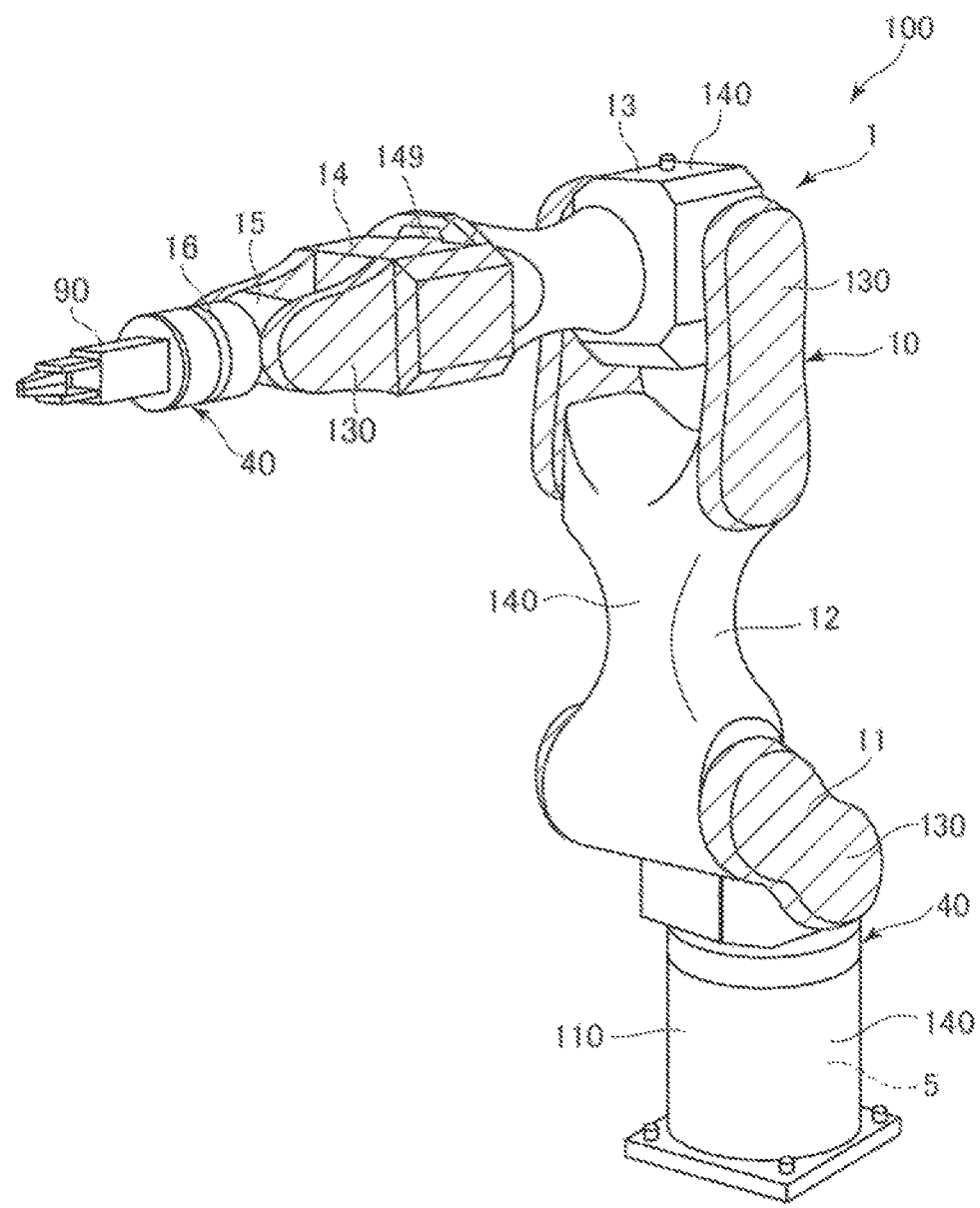
FIG. 10 is a view illustrating disposition of a metal member and a resin member of the robot arm.
Figure 11:
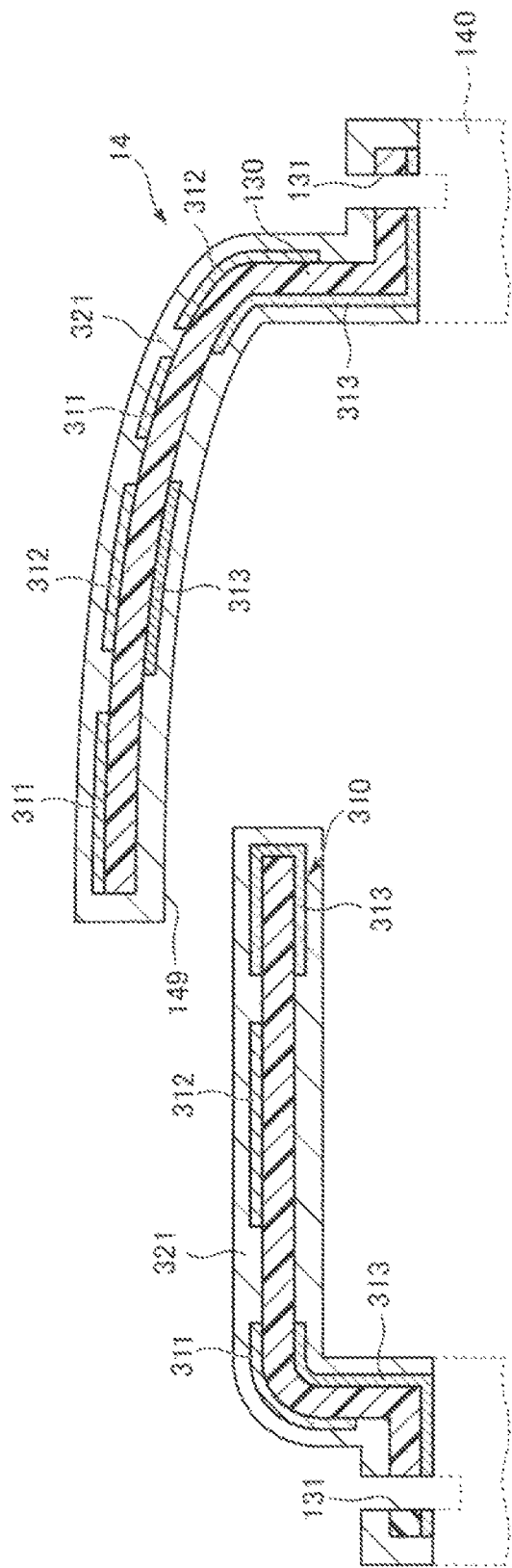
FIG. 11 is a cross-sectional view of the resin member and an electrode portion.
Figure 12:
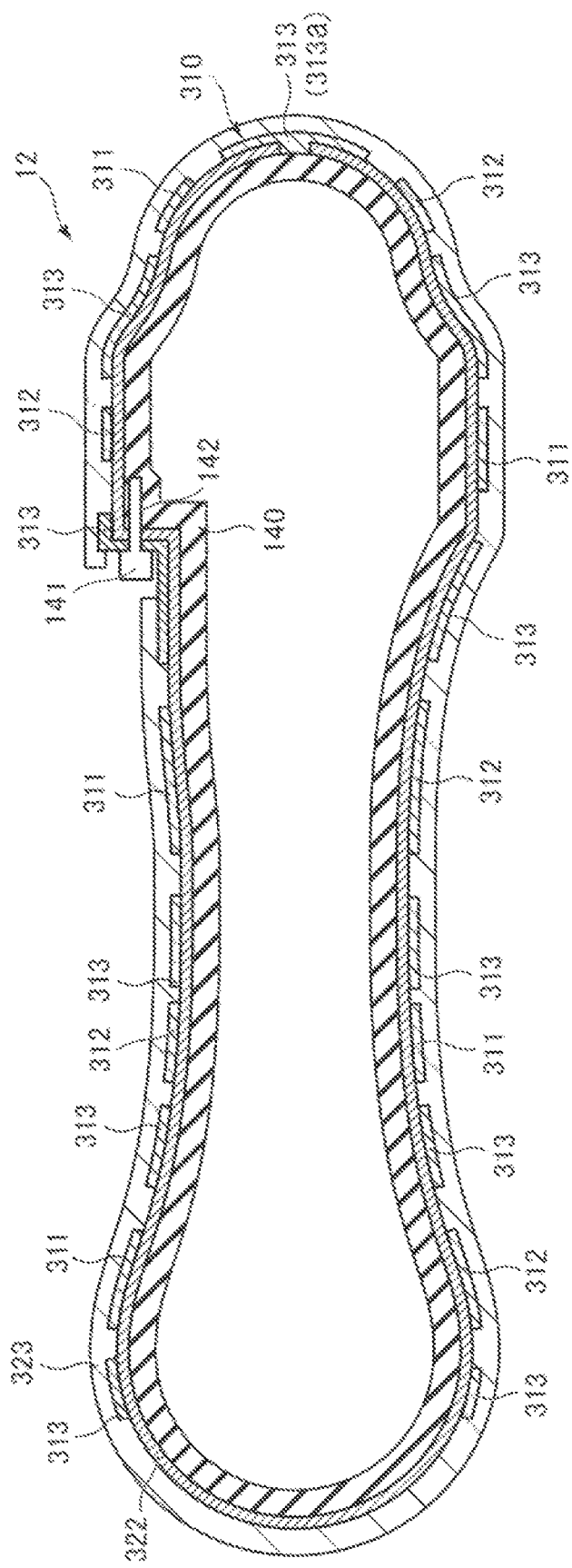
FIG. 12 is a cross-sectional view of the metal member and the electrode portion.
Figure 13:
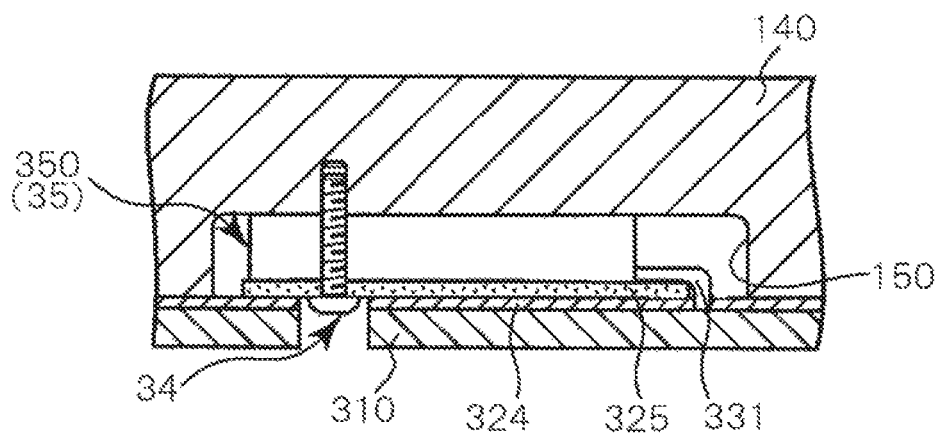
FIG. 13 is a diagram illustrating an example of a fixed state of a circuit unit to the metal member of the arm.
Figure 14:
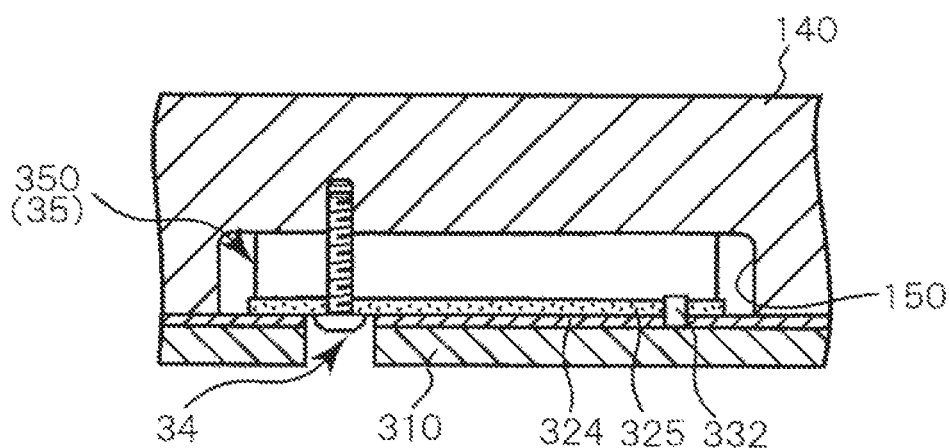
FIG. 14 is a diagram illustrating a modification example of a connection portion connecting a circuit board and the electrode portion.
Figure 15:
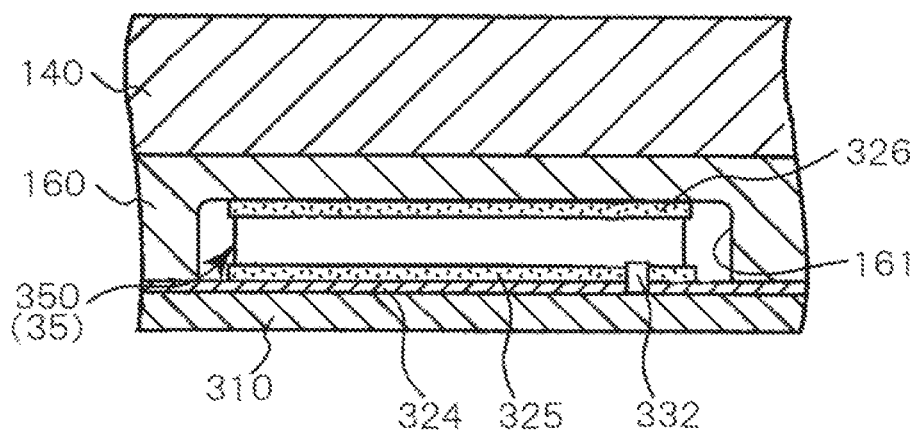
FIG. 15 is a view illustrating a modification example of the fixed state of the circuit unit to the metal member of the arm.

FIG. 10 is a view illustrating disposition of the metal member and the resin member of an exterior member of the robot main body 1. FIG. 11 is a cross-sectional view of the resin member and the electrode portion. FIG. 12 is a cross-sectional view of the metal member and the electrode portion. FIG. 13 is a diagram illustrating an example of a fixed state of the circuit unit to the metal member of the arm. FIG. 14 is a diagram illustrating a modification example of the connection portion connecting a circuit board and the electrode portion. FIG. 15 is a view illustrating a modification example of the fixed state of the circuit unit to the metal member of the arm.

As described above, the proximity sensor 30 is an electrostatic capacitance type sensor for detecting the contact or approach of an object from a change in electrostatic capacitance, and includes the electrode portion 310, the circuit unit 35, and the wiring 331 (see FIG. 3).

Electrode Portion

The electrode portion 310 includes the first electrode 311 (detection electrode), the second electrode 312 (drive electrode), and the ground electrode 313, and is provided on the outer surfaces of the arms 11 to 14, more specifically on the outer surfaces of the exterior members of the arms 11 to 14 (see FIGS. 3 and 5).

Here, as illustrated in FIG. 10, the base 110 and the robot movable unit 10 are configured to include the resin member 130 (for example, a cover) mainly made of a resin material and a metal member 140 mainly made of a metal material (for example, a housing). The hatched place in FIG. 10 is configured by the resin member 130, and the other place is configured by the metal member 140. For example, the metal member 140 is a portion serving as a skeleton of the robot main body 1, and the resin member 130 is a portion configuring the robot main body 1 together with the metal member 140 connected to the metal member 140. Hereinafter, the electrode portion 310 provided on the resin member 130 and the electrode portion 310 provided on the metal member 140 will be sequentially described.

Electrode Portion Provided on Resin Member

The resin member 130 illustrated in FIG. 11 is formed by, for example, injection molding. In FIG. 11, a part of the resin member 130 included in the arm 14 is illustrated as an example. The first electrode 311, the second electrode 312, and the ground electrode 313 are disposed on the surface of the resin member 130, and the outer surfaces of the first electrode 311, the second electrode 312, and the ground electrode 313 are covered with the insulation layer 321 made of, for example, a resin material, a metal oxide, a metal nitride, or the like.

Specifically, the first electrode 311 and the second electrode 312 are disposed on the outer surface side of the resin member 130, and the ground electrode 313 is disposed at a place corresponding to the first electrode 311 on the surface on the side opposite to the outer surface side of the resin member 130. The ground electrode 313 is provided on the outer surface of the resin member 130 in the vicinity of the connector insertion portion 149. Since the connector insertion portion 149 is a portion to which a connector (not illustrated) electrically connected to the end effector 90 is connected, it is preferable that the first electrode 311 and the second electrode 312 are not provided in the vicinity of the connector insertion portion 149. This is for preventing proximity detection with respect to the connector and the wiring (not illustrated) connected to the connector. The resin member 130 (for example, a cover) is screwed to the metal member 140 (for example, a housing) using a screw (not illustrated) in a screw hole 131. With this configuration, the ground electrode 313 provided on the resin member 130 can be electrically connected to the metal member 140, and the ground electrode 313 can be easily grounded.

A method of forming such a first electrode 311, a second electrode 312, and a ground electrode 313 is not particularly limited, a physical vapor deposition method such as a vacuum vapor deposition method, a chemical vapor deposition method such as CVD, various coating methods such as an ink jet method, a sputtering method, plating, bonding of a metal foil, and the like can be used. For example, after a metal film is formed, the metal film is patterned using a photolithography method, a dry etching method, or the like, so that each electrode and the wiring connected to the electrode can be collectively formed. As a method of forming the insulation layer 321, a known vapor deposition method, a coating method, or the like can be used.

Thicknesses of the first electrode 311, the second electrode 312, and the ground electrode 313 are not particularly limited, but can be set to, for example, about µm or more and 100 µm or less. Since the respective thicknesses of the first electrode 311, the second electrode 312, and the ground electrode 313 are relatively thin as described above, each of the first electrode 311, the second electrode 312, and the ground electrode 313 can follow the shape of the metal member 140 of the robot main body 1. The thickness of the insulation layer 321 is not particularly limited, but may be, for example, about 1 µm or more and 100 µm or less.

In the figure, the ground electrode 313 is provided on apart of the surface on aside opposite to the outer surface of the resin member 130, but the ground electrode 313 may be provided over the entire area of the surface on a side opposite to the outer surface of the resin member 130.

Electrode Portion Provided on Metal Member

As illustrated in FIG. 12, the metal member 140 is configured by fastening two members formed by a casting method such as die casting or the like with a screw 141, for example. In FIG. 12, a part of the metal member 140 of the arm 12 is illustrated as an example. On the outer surface of the metal member 140, the first electrode 311, the second electrode 312, and the ground electrode 313 are disposed with an insulation layer 322 interposed therebetween. Furthermore, the outer surface of the first electrode 311, the second electrode 312, and the ground electrode 313 is covered with an insulation layer 323. The constituent materials, forming method, and film thickness of the insulation layers 322 and 323 are the same as those of the insulation layer 321 described above.

The metal member 140 functions as the ground electrode 313. Thus, it is possible to omit trouble of separately providing the ground electrode 313. The ground electrode 313 disposed on the outer surface side of the metal member 140 functions as a shield electrode of the first electrode 311. The ground electrode 313 is disposed in the vicinity of a screw hole 142 into which the screw 141 is inserted. The ground electrode 313 disposed in the vicinity of the screw hole 142 and the metal member 140 are electrically connected via the screw 141, and the screw 141 also functions as a wiring for electrically connecting the ground electrode 313 and the metal member 140. Further, like the ground electrode 313a illustrated in FIG. 12, a part of the insulation layer 322 may be removed to connect the ground electrode 313a and the metal member 140. That is, a part of the ground electrode 313a may be used as a wiring instead of the screw 141.

In the figure, the metal member 140 has the function of the ground electrode 313 at the reference potential, but the ground electrode 313 may be additionally provided. With this configuration, it is possible to achieve higher sensitivity of the proximity sensor 30 than in the case of grounding by the metal member 140 which is a part of the robot main body 1.

Circuit Unit

The circuit unit 35 is provided on the outer surfaces of the arms 11 to 14, more specifically on the outer surfaces of the exterior members of the arms 11 to 14 (see FIG. 5).

Specifically, as illustrated in FIG. 13, a circuit board 350 on which the circuit unit 35 is installed is provided in a recess 150 formed in the metal member 140. The circuit board 350 may be provided on the resin member 130.

The circuit board 350 is fixed to the metal member 140 by the screw 34. The electrode portion 310 provided in the vicinity of the circuit board 350 is fixed to the circuit board 350 via adhesive 325 and an insulation layer 324. The wiring 331 (connection portion) electrically connecting the circuit board 350 and the electrode portion 310 is fixed by the adhesive 325 so that movement of the wiring 331 is restricted. As the adhesive 325, for example, adhesive having insulation properties such as silicone-based adhesive, epoxy-based adhesive, acrylic-based adhesive, cyanoacrylate-based adhesive, polyurethane-based adhesive or the like can be used. The insulation layer 324 has the same configuration as that of the insulation layer 321 described above.

As such, the circuit board 350, the electrode portion 310, and the wiring 331 are fixed so that relative positions of the circuit board 350, the electrode portion 310, and the wiring 331 with respect to the metal member 140 do not change. With this configuration, even when the arms 11 to 14 operate, deformation, swinging, bending, or the like of each electrode of the circuit board 350 and the electrode portion 310 can be reduced or prevented. For that reason, it is possible to reduce or prevent a change in the parasitic capacitance due to the deformation, swinging, bending, or the like, so that malfunction of the proximity sensor 30 can be reduced or prevented.

As illustrated in FIG. 14, the circuit board 350 and the electrode portion 310 may be electrically connected by a connector 332 (connection portion). With this configuration, compared to the wiring 331 illustrated in FIG. 13, there is an advantage that it is easy to restrict movement of the wiring 331. For that reason, it is possible to further reduce the change in a parasitic capacitance due to the deformation, swinging, bending, and the like of the connector 332, as compared with the case of the wiring 331.

As illustrated in FIG. 15, the circuit board 350 may be fixed to the metal member 140 via a spacer 160 made of a highly rigidity material having a relatively high Young's modulus such as ceramic, a resin material or the like, and being hard to bend. Specifically, the circuit board 350 is fixed to the bottom surface of a recess 161 of the spacer 160 via adhesive 326, and the spacer 160 is fixed to the metal member 140 with adhesive, a screw, or the like. Since it is possible to omit trouble of forming the recess 150 for accommodating the circuit board 350 in the metal member 140 by using such a spacer 160, the proximity sensor 30 can be easily provided on the arms 11 to 14. Even with such a configuration, since it is possible to reduce or prevent deformation, swinging, bending, or the like of the circuit board 350, the electrode portion 310, and the connector 332, the change in parasitic capacitance caused by such deformation, swinging, bending, or the like can be reduced or prevented.

The proximity sensor 30 has been described as above in detail. As described above, the proximity sensor 30 is an electrostatic capacitance type sensor for detecting contact or approach of an object from a change in electrostatic capacitance and includes the electrode portion 310 for outputting a signal (electric charge) in response to a change in electrostatic capacitance caused by the contact or approach of the object, the circuit unit 35 for processing a signal (electric charge), and the wiring 331 (connection portion) or the connector 332 (connection portion) for electrically connecting the electrode portion 310 and the circuit unit 35.

With this configuration, it is possible to detect the contact or approach of the object without being greatly affected by the color of the object or the influence of the ambient temperature, compared to other sensors such as a photoelectric type sensor, for example.

The "proximity sensor" may be any sensor that detects the contact or approach of an object, and is not limited to the electrostatic capacitance type proximity sensor 30. For example, the "proximity sensor" may be a photoelectric type sensor, an ultrasonic type sensor, an inductive type sensor, or the like. In the embodiment, the proximity sensor 30 of the mutual capacitance type is used as the "proximity sensor", but the "proximity sensor" may be a self-capacitance type sensor. By using proximity sensor 30 of the mutual capacitance type, it is hardly affected by the environment, and it is possible to achieve high sensitivity. On the other hand, in the self-capacitance type sensor, since the electrode portion can be configured by one electrode (an electrode serving also as a detection electrode and a drive electrode), the configuration can be simplified.

As described above, the electrode portion 310 is provided on each of the outer surfaces of the arms 11 to 14.

With this configuration, since deformation or displacement of the electrode portion 310 can be reduced as compared with the case where the electrode portion 310 is provided on a soft cushion for collision absorption as in the related art, a change of parasitic capacitance due to deformation of the electrode portion 310 can be reduced or prevented.

Furthermore, as described above, the electrode portion 310 is provided along the outer shapes of the arms 11 to 14, and the electrode portion 310 includes a portion bent so as to follow the outer shape of the arms 11 to 14. Furthermore, for example, the electrode portion 310 is disposed so as to follow complicated shapes such as the connector insertion portion 149 and the like.

With this configuration, since it is possible to widen the range in which the contact or approach of the object to the robot main body 1 can be detected, as compared with the case where the electrode portion 310 is not provided at the bent portion of the outer surface of the arms 11 to 14, safety performance of the robot 100 can be further improved.

As described above, the electrode portion 310 is fixed to each of the arms 11 to 14 (specifically, the metal member 140 or the resin member 130 included in the arms) so that the relative position with respect to each of the arms 11 to 14 does not change during operation of the robot movable unit 10.

With this configuration, since it is possible to reduce or prevent a change in the parasitic capacitance due to deformation or oscillation of the electrode portion 310, malfunction of the proximity sensor 30 due to deformation or oscillation of the electrode portion 310 can be reduced or prevented.

Furthermore, as described above, the circuit unit 35 (specifically, the circuit board 350 on which the circuit unit 35 is installed) is fixed to each of the arms 11 to 14 so that the relative position with respect to each of the arms 11 to 14 does not change during operation of the robot movable unit 10.

With this configuration, it is possible to reduce or prevent malfunction of the proximity sensor 30 due to deformation, swinging or the like of the circuit board 350.

In the embodiment, the circuit unit 35 including the detection circuit unit 36 and the drive circuit (not illustrated) is installed on one circuit board 350, but the detection circuit unit 36 and the drive circuit may be mounted on a separate board. That is, a board on which the detection circuit unit 36 is installed and a board on which the drive circuit is installed may be separate bodies. In that case, the board on which at least the detection circuit unit 36 is installed may be provided so that the relative position with respect to each of the arms 11 to 14 on which the board is provided does not change.

In addition, as described above, the wiring 331 (connection portion) or the connector 332 (connection portion) is provided so that the relative position with respect to the electrode portion 310 and the circuit unit 35 (specifically, the circuit board 350 on which the circuit unit 35 is mounted) does not change during the operation of the robot movable unit 10.

With this configuration, it is possible to reduce or prevent malfunction of the proximity sensor 30 due to deformation, swinging, and the like of the wiring 331 and the connector 332.

Although the robot according to an aspect of the invention has been described based on the preferred embodiment illustrated in the drawings, the invention is not limited thereto, and the configuration of each constitutional element may be replaced with any configuration having the same function. Further, any other constituent elements may be added.

In the embodiment described above, the number of the robot movable units is one, but the number of the robot movable units is not limited thereto, and may be two or more, for example. That is, the robot according to an aspect of the invention may be a multi-arm robot such as a dual arm robot, for example.

In the embodiment described above, the number of arms of the robot movable unit is not limited to the number of the above-described embodiments, and may be, for example, three or more and five or less, or seven or more.

Further, the robot according to an aspect of the invention is not limited to a so-called six-axis vertical articulated robot, but may be another robot such as a SCARA robot, a single axis robot, a gantry robot, a parallel link robot, or the like.

The entire disclosure of Japanese Patent Application No. 2017-219663, filed Nov. 15, 2017 is expressly incorporated by reference herein.

What is claimed is:

1. A robot comprising:
   a robot main body;
   a sensor configured to detect approach of or contact with an object, the sensor being disposed on an exterior of the robot main body; and
   a controller configured to control a driver of the robot main body based on an output signal of the sensor,
   wherein the sensor includes
      a detection electrode configured to detect approach of or contact with the object;
      a detection circuit configured to detect output changes in accordance with approach or contact between the detection electrode and the object; and
      a connector configured to electrically connect the detection electrode and the detection circuit,
   wherein the detection electrode is disposed on the exterior of the robot main body, and
   a relative position of the connector with respect to the detection electrode and a relative position of the detection circuit with respect to the connector do not change.

2. The robot according to claim 1,
   wherein the outer surface of the robot main body has a curved surface, and
   the detection electrode includes a curved surface fixed on the curved surface of the outer surface of the robot main body, the curved surface of the detection electrode corresponding with the curved surface of the outer surface of the robot main body.

3. The robot according claim 1,
   wherein the sensor is an electrostatic capacitance sensor configured to detect contact or approach of the object according to a change in electrostatic capacitance of the detection electrode.

4. The robot according to claim 3,
   wherein the sensor is a mutual-capacitive electrostatic capacitance sensor including the detection electrode and a drive electrode.

5. The robot according to claim 1,
   wherein the controller is configured to control the driver of the robot main body so as to avoid approach between the robot main body and the object based on the output signal of the sensor.

6. The robot according to claim 1,
   wherein the robot main body includes a force detection system, and
   the controller is configured to control the driver of the robot main body based on the output signal of the sensor and an output signal of the force detection system.

7. The robot according to claim 6,
   wherein force control of a target is performed based on the output signal of the force detection system, and
   approach between the robot main body and the object is avoided based on the output signal of the sensor.

8. The robot according to claim 6,
   wherein approach between the robot main body and the object is avoided based on the output signal of the sensor, and
   contact between any one of the robot main body, an end effector, the target, and the object is avoided based on the output signal of the force detection system.

9. The robot according to claim 1,
   wherein the detection electrode is curved along a longitudinal axis of the detection electrode and includes comb teeth extending along the longitudinal axis, and
   wherein the longitudinal axis of the detection electrode extends parallel to a longitudinal axis of the robot arm.

10. The robot according to claim 1, further comprising a drive electrode,
    wherein the detection electrode includes comb teeth,
    wherein the drive electrode includes comb teeth, and
    wherein the comb teeth of the detection electrode are electrically engaged with the comb teeth of the drive electrode.

11. A robot comprising:
    a robot main body;
    a sensor configured to detect approach of or contact with an object, the sensor being disposed on an interior surface of the robot main body; and a controller configured to control a driver of the robot main body based on an output signal of the sensor,
wherein the sensor includes
a detection electrode configured to detect approach of or contact with the object;
a detection circuit configured to detect output changes in accordance with approach or contact between the detection electrode and the object; and
a connector configured to electrically connect the detection electrode and the detection circuit,
wherein the detection electrode is disposed on the interior surface of the robot main body, and
a relative position of the connector with respect to the detection electrode and a relative position of the detection circuit with respect to the connector do not change.

12. The robot according to claim 11,
wherein the interior surface of the robot main body has a curved surface, and
the detection electrode includes a curved surface shape fixed on the curved surface of the interior surface of the robot main body, the curved surface of the detection electrode corresponding with the curved surface of the interior surface of the robot main body.

13. The robot according claim 11,
wherein the sensor is an electrostatic capacitance sensor configured to detect contact or approach of the object according to a change in electrostatic capacitance of the detection electrode.

14. The robot according to claim 13, wherein the sensor is a mutual-capacitive electrostatic capacitance sensor including the detection electrode and a drive electrode.

15. The robot according to claim 11,
wherein the detection electrode is curved along a longitudinal axis of the detection electrode and has comb teeth extending along the longitudinal axis, and
wherein the longitudinal axis of the detection electrode extends parallel to a longitudinal axis of the robot arm.

16. The robot according to claim 11, further comprising:
a drive electrode,
wherein the detection electrode includes comb teeth,
wherein the drive electrode includes comb teeth, and
wherein the comb teeth of the detection electrode are electrically engaged with the comb teeth of the drive electrode.

* * * * *